(12) United States Patent
Onishi et al.

(10) Patent No.: US 7,255,038 B2
(45) Date of Patent: Aug. 14, 2007

(54) PISTON FOR AUTOMATIC TRANSMISSION

(75) Inventors: Hirofumi Onishi, Aichi-gun (JP); Yuji Yasuda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/261,542

(22) Filed: Oct. 31, 2005

(65) Prior Publication Data

US 2006/0090643 A1 May 4, 2006

(30) Foreign Application Priority Data

Nov. 4, 2004 (JP) .............................. 2004-321132

(51) Int. Cl.
*F16D 25/0638* (2006.01)
*F16D 21/02* (2006.01)

(52) U.S. Cl. .................................... 92/255; 192/85 AA
(58) Field of Classification Search .................. 92/255; 192/45.91, 48.8, 89.2, 85 AA
See application file for complete search history.

(56) References Cited

U.S. PATENT DOCUMENTS 6,513,636 B2 * 2/2003 Han et al. ............... 192/85 AA
6,523,657 B1 * 2/2003 Kundermann et al. ..... 192/48.8
6,702,081 B2 * 3/2004 Gorman et al. ............. 192/52.2
2004/0206599 A1 10/2004 Hegerath
2005/0000774 A1 * 1/2005 Friedmann ................. 192/48.8

FOREIGN PATENT DOCUMENTS

| DE | 38 38 865 A1 | 6/1989 |
| DE | 42 39 233 A1 | 5/1994 |
| EP | 1 464 859 A2 | 10/2004 |
| FR | 2 626 638 | 8/1989 |
| JP | 9-32919 | 2/1997 |
| JP | 2003-42184 | 2/2003 |

* cited by examiner

*Primary Examiner*—Thomas E. Lazo
(74) *Attorney, Agent, or Firm*—Oblon, Spivak, McClelland, Maier & Neustadt, P.C.

(57) ABSTRACT

A piston for an automatic transmission includes: (a) a cylindrical wall portion provided by a first piston member; (b) a bottom wall portion provided by a second piston member; and (c) an engaging portion at which the first and second piston members are engaged with each other such that the first piston member is movable relative to the second piston member in an axial direction of the piston by a small distance. The piston is characterized by further including (d) an elastic structure which is provided at the engaging portion, and which biases the first piston member in the axial direction, so as to restrain movement of the first piston member relative to the second piston member in the axial direction.

12 Claims, 11 Drawing Sheets

PISTON FOR AUTOMATIC TRANSMISSION

This application is based on Japanese Patent Application No. 2004-321132 filed on Nov. 4, 2004, the content of which is incorporated hereinto by reference.

BACKGROUND OF THE INVENTION

1. Field of the Invention

The present invention relates in general to a piston operable to force frictional coupling elements of a clutch or brake provided in an automatic transmission, against each other to place the clutch or brake in its engaged state.

2. Discussion of Related Art

A known automatic transmission includes clutches and brakes each of which is provided with frictional coupling elements in the form of a plurality of friction plates, so that the automatic transmission is automatically shifted by selectively engaging and releasing the clutches and brakes. The frictional coupling elements are forced against each other by a piston, to place each clutch or brake in its engaged state. JP-H09-32919A discloses an example of such a piston, which consists of two members, namely, a first piston member providing a cylindrical wall portion of the piston, and a second piston member providing a bottom wall portion of the piston. In this piston disclosed in JP-H09-32919A, the first piston member (cylindrical wall portion) has cutouts, while the second piston member (bottom wall portion) has engaging portions fitted in the cutouts, so that the first and second piston members are fixed to each other into the piston, with a snap ring.

Where the piston is constituted by the first piston member providing the cylindrical wall portion and the second piston member providing the bottom wall portion, which are fixed to each other with a snap ring or the like, a small gap inevitably exists in the axial direction of the piston, between the first and second piston members fixed together with the snap ring, due to axial dimensional errors within a predetermined tolerance, so that the first and second piston members are undesirably movable relative to each other in the axial direction of the piston, in the presence of the above-indicated gap. Accordingly, the first piston member tends to have a rattling movement in the axial direction, giving rise to a risk of unnecessary abutting contact of the first piston member with the outermost one of the frictional coupling elements, which may cause unnecessary mutual frictional contact of the frictional coupling elements, leading to so-called "dragging" of the clutch or brake, and consequent deterioration of durability of the piston and the frictional coupling elements, and an increase in power loss of the automatic transmission due to the dragging.

SUMMARY OF THE INVENTION

The present invention was made in the light of the background art discussed above. It is therefore an object of the present invention to provide a piston for an automatic transmission, which includes a cylindrical wall portion provided by a first piston member and a bottom wall portion provided by a second piston member and which has improved durability and operating efficiency and assures improved durability of frictional coupling elements and improved power transmitting efficiency of the automatic transmission. This object may be achieved according to any one of first through twelfth aspects of the invention which are described below.

The first aspect of this invention provides a piston for an automatic transmission, including: (a) a cylindrical wall portion provided by a first piston member; (b) a bottom wall portion provided by a second piston member; and (c) an engaging portion at which the first and second piston members are engaged with each other such that the first piston member is movable relative to the second piston member in an axial direction of the piston by a small distance, wherein an improvement comprises the piston further including (d) an elastic structure which is provided at the engaging portion, and which biases the first piston member in the axial direction, so as to restrain movement of the first piston member relative to the second piston member in the axial direction.

According to the second aspect of the invention, in the piston defined in the first aspect of the invention, the first piston member has, in an axially end portion thereof, at least one engaging groove at which the first piston member is engaged with the second piston member, wherein the second piston member has at least one elastic lug each provided by a portion thereof that is inclined in the axial direction, namely, inclined with respect to a radial direction of the piston, and wherein the elastic structure includes the at least one elastic lug that is held in contact with a radially extending surface of the first piston member, the radially extending surface defining a corresponding one of the at least one engaging groove and being substantially parallel to the radial direction.

According to the third aspect of the invention, in the piston defined in the second aspect of the invention, the second piston member has a plurality of engaging protrusions which radially outwardly protrude and which are arranged in a circumferential direction of the piston, such that each of the plurality of engaging protrusions is engaged with a corresponding one of a plurality of engaging grooves as the at least one engaging groove, wherein each of a plurality of elastic lugs as the at least one elastic lug is provided by a corresponding one of the plurality of engaging protrusions that are inclined in the axial direction, namely, inclined with respect to the radial direction.

According to the fourth aspect of the invention, in the piston defined in the second aspect of the invention, the second piston member has a plurality of engaging protrusions which radially outwardly protrude and which are arranged in a circumferential direction of the piston, such that each of the plurality of engaging protrusions is engaged with a corresponding one of a plurality of engaging grooves as the at least one engaging groove, wherein each of a plurality of elastic lugs as the at least one elastic lug is provided by a portion of a corresponding one of the plurality of engaging protrusions, the portion being inclined in the axial direction, namely, inclined with respect to the radial direction.

According to the fifth aspect of the invention, in the piston defined in any one of the second through fourth aspects of the invention, each of the at least one elastic lug has a surface which is substantially parallel to the radial direction and which is held in contact with the radially extending surface.

According to the sixth aspect of the invention, in the piston defined in the first aspect of the invention, the first piston member has at least one elastic lug each provided by a portion thereof that is inclined in the radial direction, namely, inclined with respect to the axial direction of the piston, wherein the second piston member has a radially extending surface which is substantially parallel to a radial direction of the piston, and wherein the elastic structure includes the at least one elastic lug each of which is held in contact at a distal end portion thereof with the radially extending surface.

According to the seventh aspect of the invention, in the piston defined in the sixth aspect of the invention, each of the at least one elastic lug has a surface which is substantially parallel to the radial direction and which is held in contact with the radially extending surface.

According to the eighth aspect of the invention, in the piston defined in the first aspect of the invention, the elastic structure includes an elastic member disposed in the engaging portion and interposed between the first and second piston members, such that the elastic member is held in contact with the first and second piston members.

According to the ninth aspect of the invention, in the piston defined in any one of the second through fifth aspects of the invention, a retainer is further provided to be disposed to hold the second piston member in a position relative to the first piston member in the axial direction, the position causing the at least one elastic lug of the second piston member to be forced against the radially extending surface of the first piston member, so as to be elastically deformed, wherein the first piston member is biased in the axial direction, owing to a restoring force generated by the at least one elastic lug that is elastically deformed.

According to the tenth aspect of the invention, in the piston defined in the sixth or seventh aspect of the invention, a retainer is further provided to be disposed to hold the second piston member in a position relative to the first piston member in the axial direction, the position causing the radially extending surface of the second piston member to be forced against the at least one elastic lug of the first piston member, so as to elastically deform the at least one elastic lug, wherein the first piston member is biased in the axial direction, owing to a restoring force generated by the at least one elastic lug that is elastically deformed.

According to the eleventh aspect of the invention, in the piston defined in the eighth aspect of the invention, a retainer is further provided to be disposed to hold the second piston member in a position relative to the first piston member in the axial direction, the position causing the elastic member to be forced against the first piston member and to be elastically deformed, wherein the first piston member is biased in the axial direction, owing to a restoring force generated by the elastic member that is elastically deformed.

According to the twelfth aspect of the invention, the piston defined in any one of the first through eleventh aspects of the invention is operable to selectively place a clutch device of the automatic transmission in an engaged state and a released state thereof.

In the piston constructed according to any one of the first through twelfth aspects of the invention, the first piston member is biased by the elastic structure in the axial direction, with a result of substantial elimination of a rattling movement of the first piston member in the axial direction. This arrangement is effective to prevent an unnecessary contact of the first piston member with a set of frictional coupling elements, making it possible to improve the durability and operating efficiency of the piston and the durability of the frictional coupling elements.

In the piston constructed according to any one of the second through fifth and ninth aspects of the invention, each of the at least one elastic lug, which is provided by the portion of the second piston member that is bent or inclined with respect to the radial direction, is held in contact with the radially extending surface of the corresponding one of the at least one engaging groove, whereby the first piston member is biased in the axial direction by the at least one elastic lug.

In the piston constructed according to any one of the sixth, seventh and tenth aspects of the invention, each of the at least one elastic lug, which is provided by the portion of the first piston member that is bent or inclined with respect to the axial direction, is held in contact with the radially extending surface of the second piston member, whereby the first piston member is biased in the axial direction by the at least one elastic lug. In the piston constructed according to either one of the eighth and eleventh aspects of the invention, the first piston member is biased in the axial direction by the elastic member interposed between the first and second piston members. Therefore, each of each of the second through eleventh aspects of the invention, which corresponds to a preferred arrangement of the first aspect of the invention, provides substantially the same effect as the first aspect of the invention.

Each of the third and fourth aspects of the invention corresponds to a preferred arrangement of the second aspect of the invention, and accordingly provides substantially the same effect as the second aspect of the invention. Further, in the fourth aspect of the invention in which each of the at least one elastic lug is provided by a portion of the corresponding engaging protrusion, a biasing force generated by each elastic lug can be made smaller whereby the first and second piston members can be further easily assembled into the piston, as compared with an arrangement in which each elastic lug is provided by an entirety of the corresponding engaging protrusion.

In each of the fifth and seventh aspects of the invention, since each of the at least one elastic lug has the surface held in contact with the radially extending surface defining the corresponding engaging groove, namely, since each elastic lug is held in contact with the radially extending surface in a so-called "surface-to-surface" contact manner, each elastic lug is given an improved durability.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENT

Figure 1:
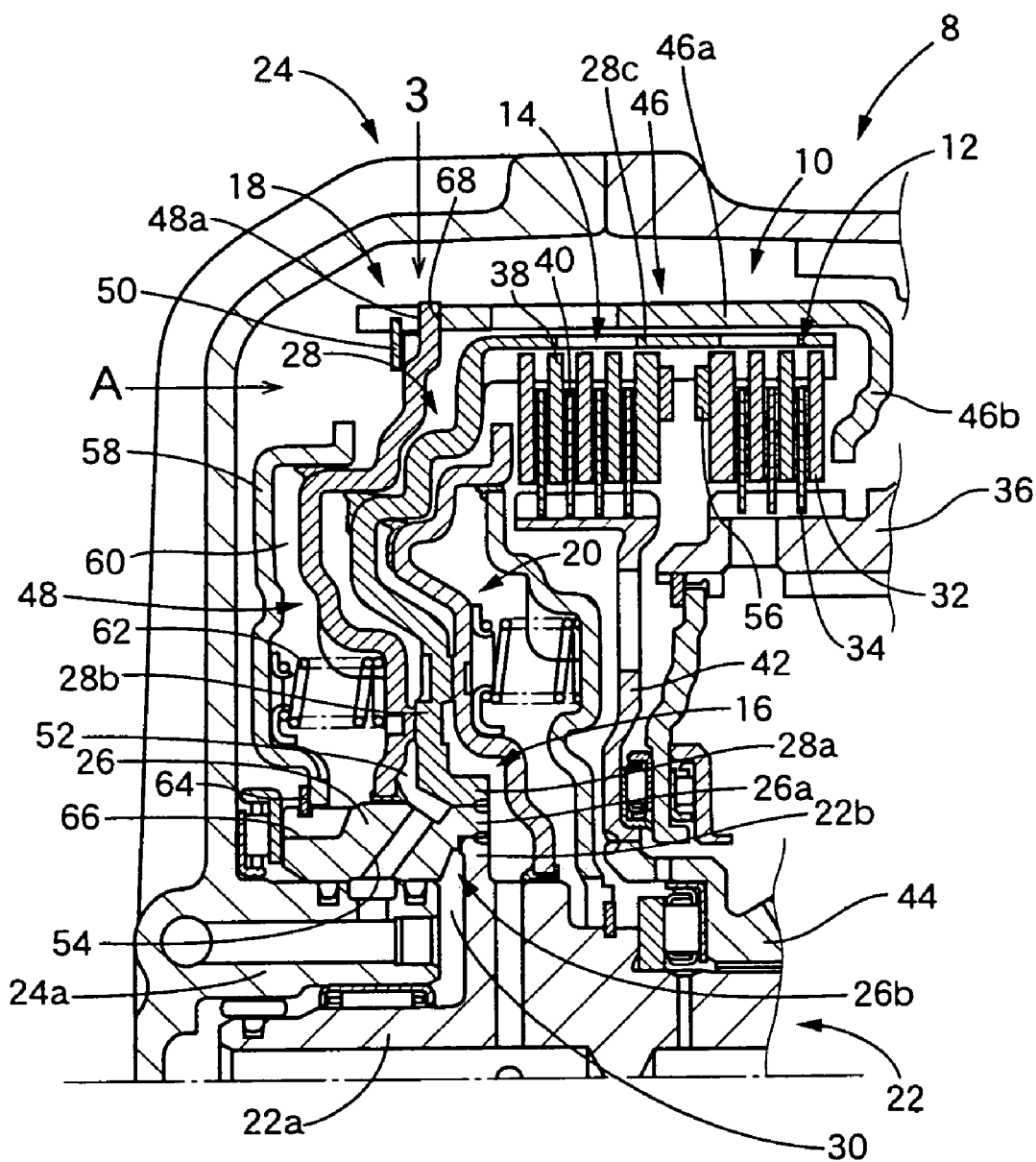
FIG. 1 is a fragmentary side elevational view in cross section of an automatic transmission which is provided a clutch device including a piston in the form of a radially outer piston constructed according to a first embodiment of this invention.

Referring first to the side elevational view in cross section of FIG. 1, there is shown a part of an automatic transmission 8 which is provided with a clutch device 10 including a piston in the form of a radially outer piston 18 constructed according to a first embodiment of this invention.

The clutch device 10 is of a double clutch construction, and includes: a clutch drum 16 supporting a first set of frictional coupling elements 12 and a second set of frictional coupling elements 14; the above-indicated radially outer piston 18 disposed radially outwardly of the clutch drum 16 so as to cover the clutch drum 16; and a radially inner piston 20 disposed radially inwardly of the clutch drum 16.

The automatic transmission 8 has a casing 24, and an input shaft 22 which is rotatably supported at its end portion 22a by the casing 24. The input shaft 22 has a flange portion 22b which is located at an axial position near the end portion 22a. The flange portion 22b extends radially outwardly perpendicularly to the axis of the input shaft 22. The input shaft 22 is a turbine shaft of a torque converter driven by a drive power source such as an engine of an automotive vehicle.

The clutch drum 16 includes a radially inner drum 26 and a radially outer drum 28. The radially inner drum 26 is a generally cylindrical member which has a substantially constant outside diameter and which is fitted on an axially extending cylindrical portion 24a of the casing 24. The radially inner drum 26 includes a thin-walled axial end portion 26a on the side of the radially inner piston 20. The inner circumferential surface of the radially inner drum 26 has a tapered and stepped portion 26b which is adjacent to the axial end portion 26a. The tapered part of the tapered and stepped portion 26b has an inside diameter which increases as viewed in an axial direction of the inner drum 26 toward the thin-walled axial end portion 26a. The axial end portion 26a has an end face which is flush with one of opposite surfaces of the flange portion 22b of the input shaft 22 which is on the side of the radially inner piston 20. The radially inner drum 26 and the input shaft 22 are welded to each other at the outer circumferential surface of the flange portion 22b and the inner circumferential surface of the axial end portion 26a. The flange portion 22b of the input shaft 22 and the tapered and stepped portion 26b of the axial end portion 26a of the radially inner drum 26 cooperate to partially define an oil sump 30, which is formed radially inwardly of the tapered and stepped portion 26b.

The radially outer drum 28 is a cylindrical wall member including an inner cylindrical portion 28a, an outer cylindrical portion 28c, and an annular bottom portion 28b which connects the corresponding axial ends of the inner and outer cylindrical portions 28a, 28c. The radially outer drum 28 is closed at its one axial end by the annular bottom portion 28b and is open at the other axial end.

The inner cylindrical portion 28a is fitted on the thin-walled axial end portion 26a of the radially inner drum 26, and the end face of the inner cylindrical portion 28a which is on the side of the radially inner piston 20 is flush with the corresponding end face of the axial end portion 26a. The radially outer and inner drums 26, 28 are welded to each other at the inner circumferential surface of the inner cylindrical portion 28a and the outer circumferential surface of the axial end portion 26a. Accordingly, the radially outer drum 28 as well as the radially inner drum 26 is rotated with the input shaft 22.

The annular bottom portion 28b of the radially outer drum 28 extends generally in the radial direction of the input shaft 22, and is connected at its radially inner end to the axial end of the inner cylindrical portion 28a which is on the side of the radially outer clutch piston 18. The outer cylindrical portion 28c extends from the radially outer end of the annular bottom portion 28b in the axial direction (in the right direction as seen in FIG. 1). The outer cylindrical portion 28c holds a plurality of inwardly extending friction plates 32 of the first set of frictional coupling elements 12, and a plurality of inwardly extending friction plates 38 of the second set of frictional coupling elements 14, such that the friction plates 32 are splined to a portion of the inner circumferential surface of the outer cylindrical portion 28c, which portion is relatively near the axial open end of the outer cylindrical portion 28c, and such that the friction plates 38 are splined to a portion of the inner circumferential surface which is relatively near the annular bottom portion 28b and relatively remote from the above-indicated axial open end. The friction plates 32, 38 extend from the inner circumferential surface of the outer cylindrical portion 28c in the radially inward direction of the clutch drum 16. The first set of frictional coupling elements 12 consist of the above-indicated inwardly extending friction plates 32 and a plurality of outwardly extending friction plates 34, which are alternately arranged in the axial direction of the clutch drum 16. Similarly, the second set of frictional coupling elements 14 consist of the above-indicated inwardly extending friction plates 38 and a plurality of outwardly extending friction plates 40, which are alternately arranged in the axial direction.

The outwardly extending friction plates 34 of the first set of frictional coupling elements 12 are splined to the outer circumferential surface of a ring gear 36 of the automatic transmission 8 which functions also as a clutch hub. The outwardly extending friction plates 40 of the second set of frictional coupling elements 14 are splined to the outer circumferential surface of a clutch hub 42. The clutch hub 42 is fixedly fitted at its inner circumferential surface on a sun gear 44 which is fixedly fitted on the input shaft 22, so that the clutch hub 42 is rotated with the sun gear 44.

The radially outer piston 18 includes: a first piston member 46 which is disposed radially outwardly of the outer cylindrical portion 28c of the radially outer drum 28 and which provides a cylindrical wall portion of the piston 18; an annular second piston member 48 which engages one of the axially opposite end portions of the first piston member 46 and which provides a bottom wall portion of the piston 18; and a snap ring 50 as a retainer which is fixed to the above-indicated one axial end portion of the first piston member 46 and which is provided to prevent removal of the second piston member 48 from the first piston member 46. The snap ring 50 is fitted at its radially outer portion in a circumferential groove 51 formed in the inner circumferential surface of the first piston member 46.

The second piston member 48 of the radially outer piston 18 is axially sidable at its inner circumferential surface on the radially inner drum 26. The second piston member 48 and the annular bottom portion 28b of the radially outer drum 28 cooperate to define a first hydraulic pressure chamber 52 to which a working oil is fed through an oil passage 54 formed through the radially inner drum 26, so that the radially outer piston 18 is axially movable in a direction causing the second piston member 48 to be moved away from the bottom portion 28b of the radially outer drum 28.

On one of axially opposite sides of the second piston member 48 which is remote from the first hydraulic pressure chamber 52, there is disposed a balancer 58 such that the balancer 58 is fitted at its inner circumferential surface on the outer circumferential surface of the radially inner drum 26. The balancer 58 cooperates with the second piston member 48 of the radially outer piston 18 to define a second hydraulic pressure chamber 60. A return spring 62 is interposed between the balancer 58 and the second piston member 48, to bias the balancer 58 and second piston member 48 in axially opposite directions away from each other. The axial position of the balancer 58 biased by the return spring 62 in the axial direction away from the radially outer piston 18 is determined by abutting contact of the balancer 58 at its radially inner end portion with a snap ring 64 fixed to the outer circumferential surface of the radially inner drum 26.

The radially inner drum 26 has an oil passage (not shown) for communication between the second hydraulic pressure chamber 60 and the oil sump 30, so that the working oil is introduced into the second hydraulic pressure chamber 60 through this oil passage. Accordingly, the second hydraulic pressure chamber 60 functions as a canceling chamber for canceling a centrifugal hydraulic pressure developed in the first hydraulic pressure chamber 52. The working oil is discharged from the second hydraulic pressure chamber 60 into a space on the axial side of the balancer 58 remote from the second hydraulic pressure chamber 60, through an axial groove 66 formed through an axial portion of the radially inner drum 26 on which the balancer 58 is fitted.

The first piston member 46 of the radially outer piston 18 is formed by a pressing operation using a suitable set of dies, and includes a cylindrical portion 46a disposed radially outwardly of the outer cylindrical portion 28c of the radially outer drum 28, and a presser portion 46b formed to extend from one axial end of the cylindrical portion 46a which is remote from the second piston member 48. The presser portion 46b extends generally in the radially inward direction and is inclined with respect to the radial direction toward the first set of frictional coupling elements 12, such that the radially inner end of the presser portion 46b is opposed to the nearest friction plate 32 of the first set of frictional coupling elements 12. When the first hydraulic pressure chamber 52 is not supplied with the pressurized working oil, there is left a small amount of clearance between the radially inner end of the presser portion 46b and the above-indicated nearest friction plate 32. The outer cylindrical portion 28c of the radially outer drum 28 has a snap ring 56 fixed to its inner circumferential surface to prevent an axial movement of the first set of frictional coupling elements 12 toward the second set of frictional coupling elements 14.

Figure 2:
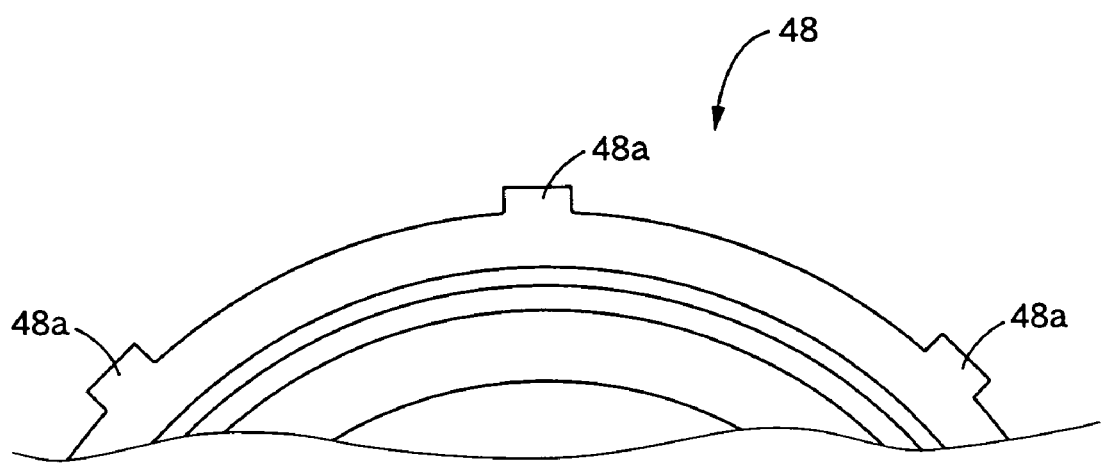
FIG. 2 is a front elevational view of a second piston member of the radially outer piston, taken in a direction of arrow-headed line A of FIG. 1.

As shown in FIG. 2 that is a view taken in the direction of arrow-headed line A of FIG. 1, the second piston member 48 of the radially outer piston 18 has a plurality of engaging protrusions 48a, more precisely, eight engaging protrusions 48a which radially outward protrude and are arranged in the circumferential direction. The eight engaging protrusions 48a are equally spaced apart from each other in the circumferential direction. The second piston member 48 as well as the first piston member 46 is formed by a pressing operation.

Figure 3:
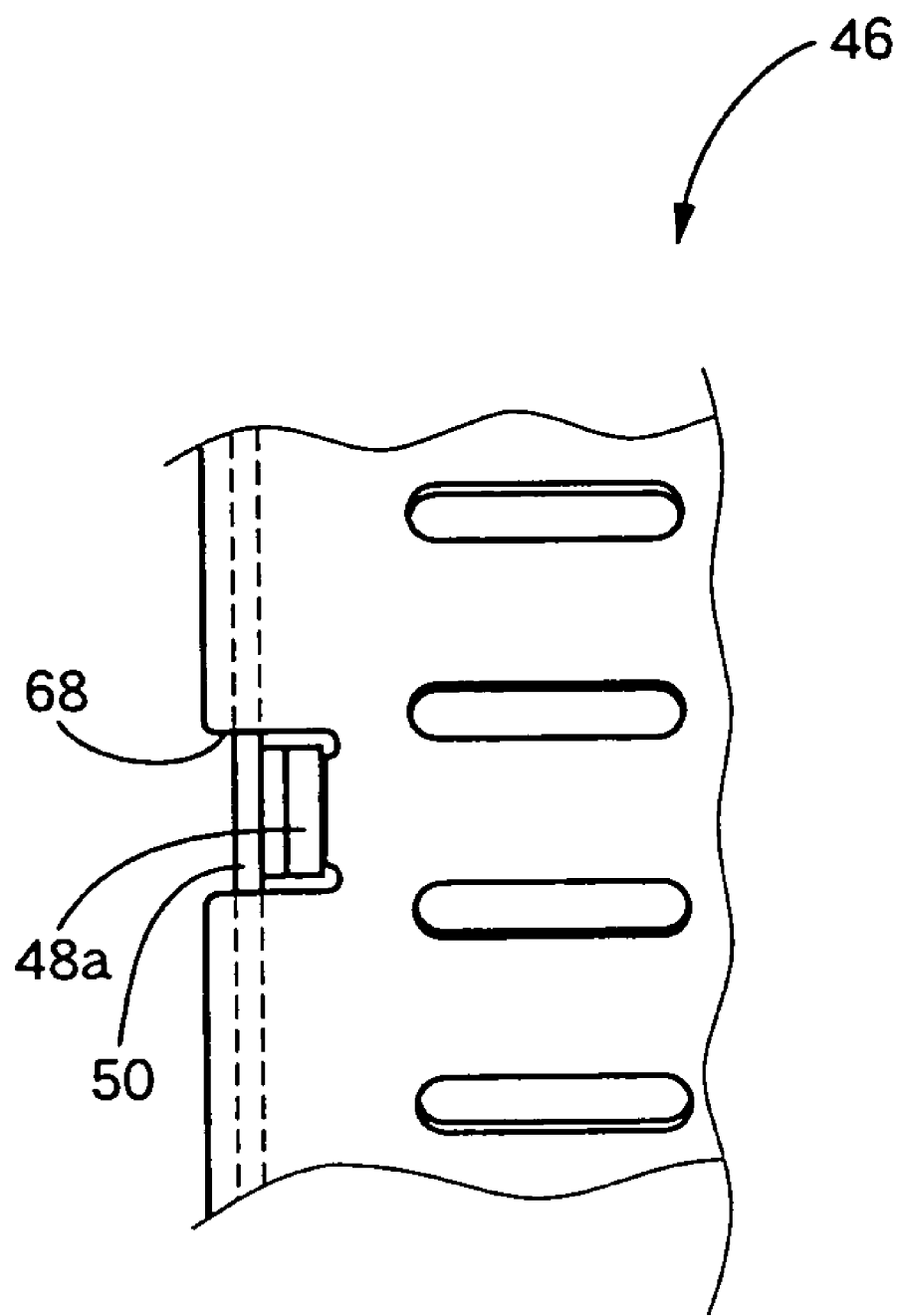
FIG. 3 is a view taken in a direction of arrow-headed line 3 of FIG. 1.

As shown in FIG. 3 that is a view taken in a direction of arrow-headed line 3 of FIG. 1, the cylindrical portion 46a of the first piston member 46 has eight engaging grooves 68 formed in one of its axially opposite end portions which is remote from the presser portion 46b, that is, at its axial end portion at which the first piston member 46 is engaged with the second piston member 48. The engaging grooves 68 are formed through the thickness of the cylindrical portion 46a in its radial direction, and extend in the axial direction of the cylindrical portion 46a. The engaging protrusions 48a of the second piston member 48 are held in engagement with the respective eight engaging grooves 68 of the first piston member 46. It is noted that the eight engaging grooves 68 are arranged to be equally spaced apart from each other in the circumferential direction, so as to be aligned with the respective engaging protrusions 48a.

Figure 4:
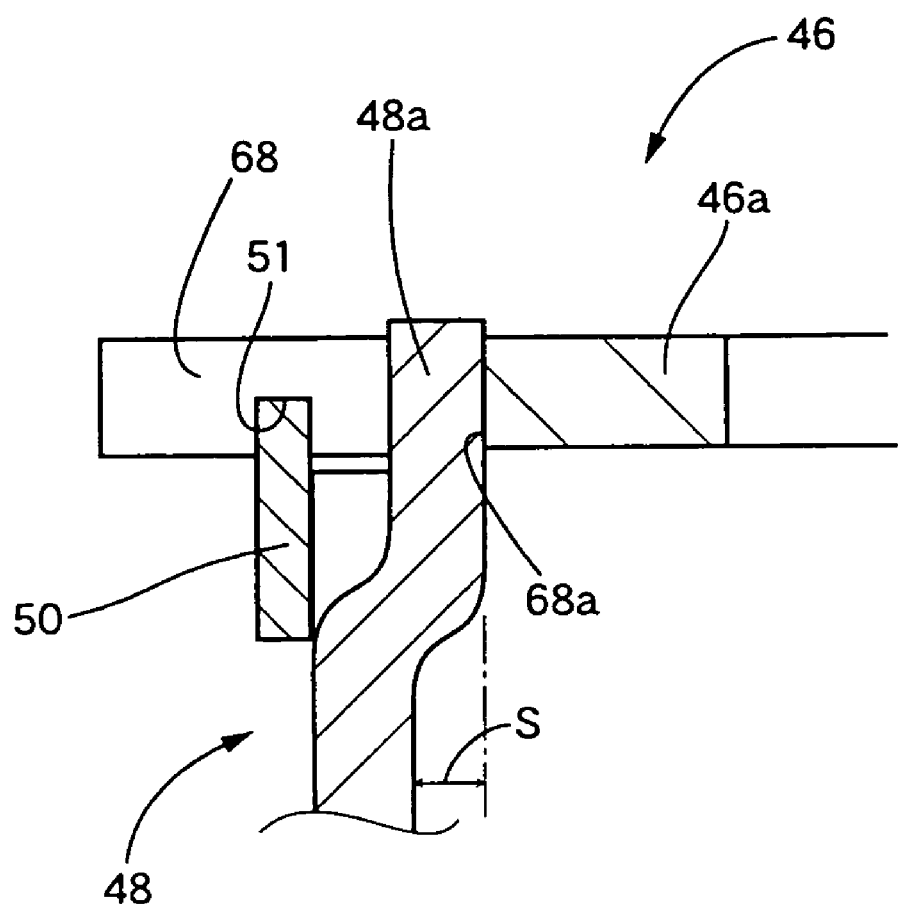
FIG. 4 is an enlarged view in cross section of an engaging portion of the piston of FIG. 1, at which the first and second piston members are engaged with each other.

FIG. 4 is an enlarged view in cross section of an engaging portion of the radially outer piston 18 at which the first and second piston members 46, 48 are engaged with each other, namely, a portion of the piston 18 at which each of the engaging protrusions 48a of the second piston member 48 is held in engagement with a corresponding one of the engaging grooves 68 of the first piston member 46. Each of the engaging protrusions 48a is bent by pressing in the axial direction toward the presser portion 46b of the first piston member 46, namely, in the axial direction away from the snap ring 50, so as to be inclined with respect to the radial direction, as shown in FIG. 4. Each of the thus bent engaging protrusions 48a is capable of generating an elastic force acting in the axial direction, and serves as an elastic claw or lug. It is noted that all of the eight engaging protrusions 48a do not necessarily have to be bent as shown in FIG. 4, as long as at least two of the engaging protrusions 48a which are symmetrical with each other with respect to the axis of the second piston member 48 are bent.

Meanwhile, the axially inner end of each engaging groove 68, which is opposite to the axially outer open end of the engaging groove 68, is defined by a radially extending surface 68a. Each of the engaging protrusions 48a is held in contact, at a distal end portion of its surface opposed to the corresponding radially extending surface 68a, with the corresponding radially extending surface 68a, thereby establishing a so-called "surface-to-surface" contact between the first and second piston members 46, 48. In the present embodiment, an elastic structure is provided by the engaging protrusions 48a each of which is bent in the direction away from the snap ring 50, in other words, is constituted by an arrangement in which the bent engaging protrusions 48a are held in pressing contact at their distal end portions with the radially extending surfaces 68a defining the respective engaging grooves 68. In an arrangement without provision of the elastic structure, the first piston member 46 has a rattling movement in the axial direction, by a distance corresponding to a small gap S between each radially extending surface 68a (defining the corresponding engaging groove 68) and the second piston member 48, which gap is inevitably formed due to nature of the manufacturing process. However, in the present embodiment, the distal end portion of each engaging protrusion 48a serving as the elastic lug is held in pressing contact with the corresponding radially extending surface 68a in the axial direction, under the elastic force of each engaging protrusion 48a, whereby the first piston member 46 is biased by the engaging protrusion 48a in the axial direction, with a result of substantial elimination of the rattling movement of the first piston member 46 relative to the second piston member 48 in the axial direction. It is noted that the snap ring 50 as the retainer serves to hold the second piston member 48 in a predetermined position relative to the first piston member 46 in the axial direction, such that the second piston member 48 held in the predetermined relative position causes the elastic lugs 48a to be forced against the radially extending surface 68a of the first piston member 46 and to be elastically deformed, whereby the first piston member 46 is biased in the axial direction, owing to a restoring force generated by the elastically deformed elastic lugs 48a.

As described above, in the present embodiment, the first piston member 46 is biased in the axial direction by the elastic structure that is provided by the engaging protrusions 48a held in pressing contact with the respective radially extending surfaces 68a, with a result of substantial elimination of a rattling movement of the first piston member 46 in the axial direction. This arrangement is effective to prevent an unnecessary contact of the first piston member 46 with the first set of frictional coupling elements 12, making it possible to improve the durability and operating efficiency of the radially outer piston 18, the durability of the first set of frictional coupling elements 12, and the power transmitting efficiency of the automatic transmission 8.

Further, in the present embodiment, since each of the engaging protrusions 48a is held in contact with the radially extending surface defining the corresponding engaging groove 68, in a "surface-to-surface" contact manner, each engaging protrusion 48a is given an improved durability.

There will next be described second through sixth embodiments of the invention. In the following description, the same reference signs as used in the first embodiment will be used to identify the functionally corresponding elements, and redundant description of these elements is not provided. It should be noted that elements of each of the second through sixth embodiments, which are not shown in the drawings, have the same construction as the functionally corresponding elements of the first embodiment.

Figure 5A:
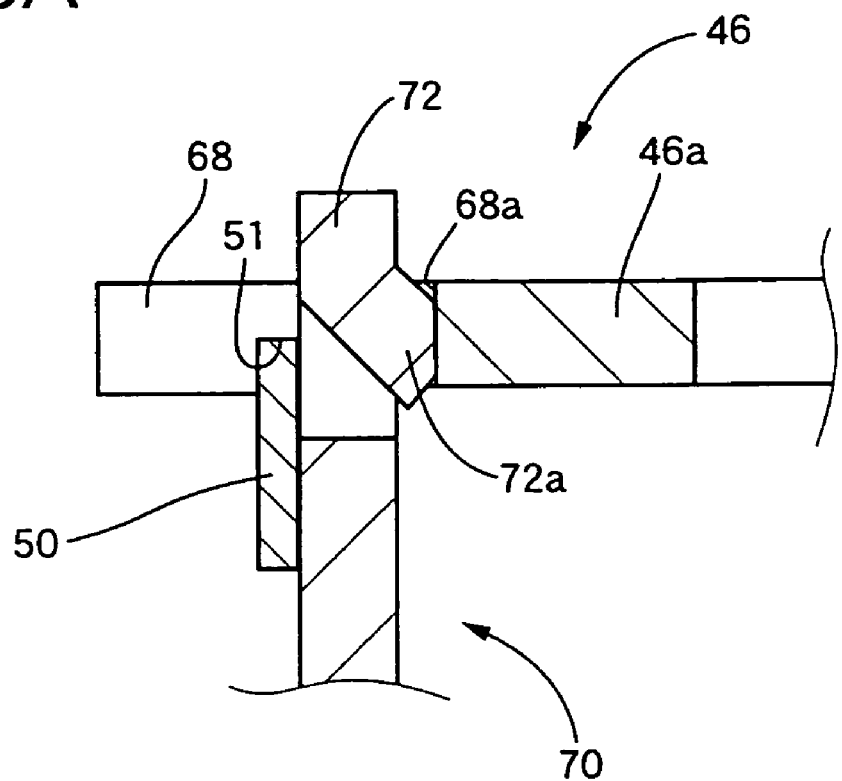
FIG. 5A is an enlarged view in cross section of an engaging portion of a piston constructed according to a second embodiment of the invention.
Figure 5B:
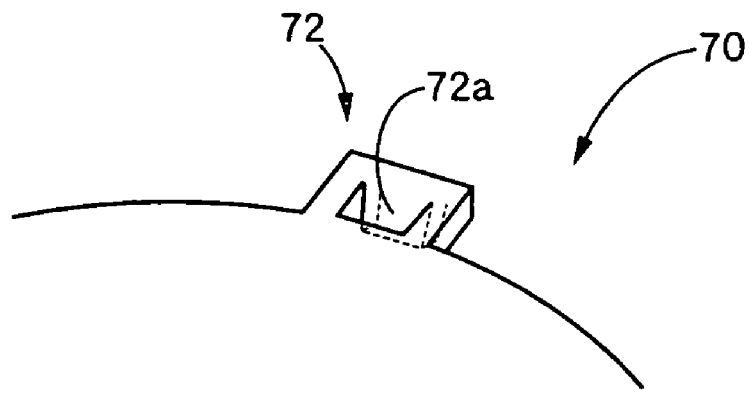
FIG. 5B is a perspective view of a second piston member of the piston constructed according to the second embodiment.

FIG. 5A is a view showing the engaging portion of the piston 18 constructed according to the second embodiment, while FIG. 5B is a perspective view of a second piston member 70 in the second embodiment. In this second embodiment, the second piston member 70 has a plurality of engaging protrusions 72, which radially outwardly protrude and are arranged in the circumferential direction, as the above-described engaging protrusions 48a. Each of the engaging protrusions 72 has a rectangular-shaped elastic lug 72a provided by its rectangular-shaped central portion that is inclined with respect to the radial direction. The elastic lug 72a is formed by a bending operation in which the rectangular-shaped central portion of each engaging protrusion 72 is cut and bent in the axial direction about its radially outer end, so that the elastic lug 72a is held in pressing contact at its distal end portion with the radially extending surface 68a of the corresponding engaging groove 68. The distal end portion of the elastic lug 72a has a contact surface at which the distal end portion of the elastic lug 72a is held in pressing contact with the radially extending surface 68a. It is noted that the contact surface is made substantially flat, for example, by a machining operation.

Figure 6A:
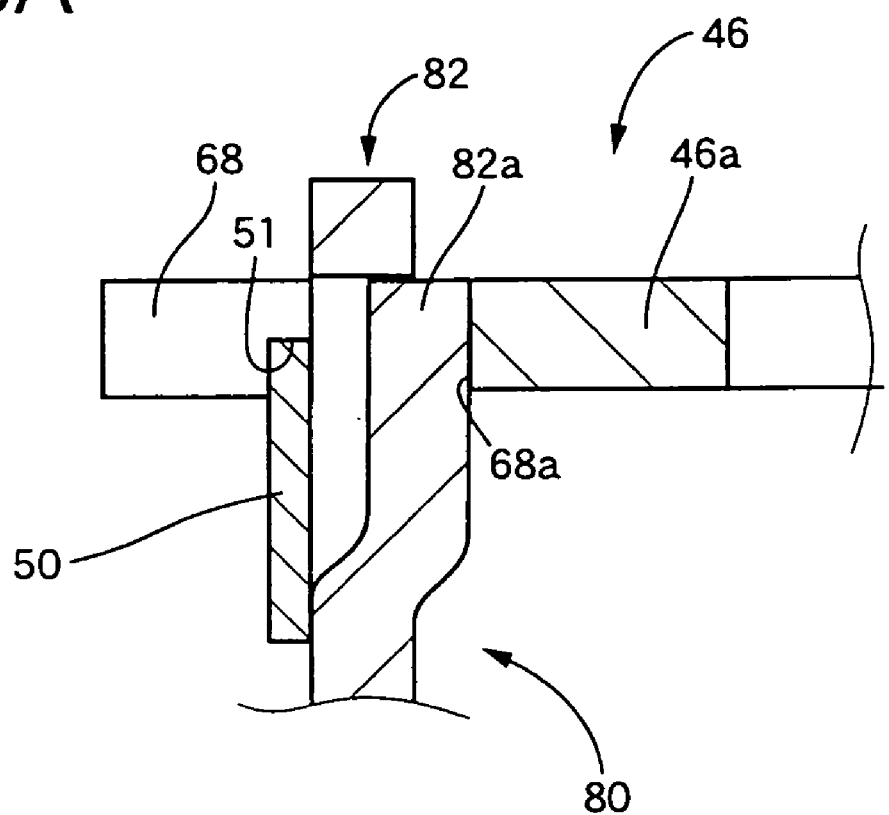
FIG. 6A is an enlarged view in cross section of an engaging portion of a piston constructed according to a third embodiment of the invention.
Figure 6B:
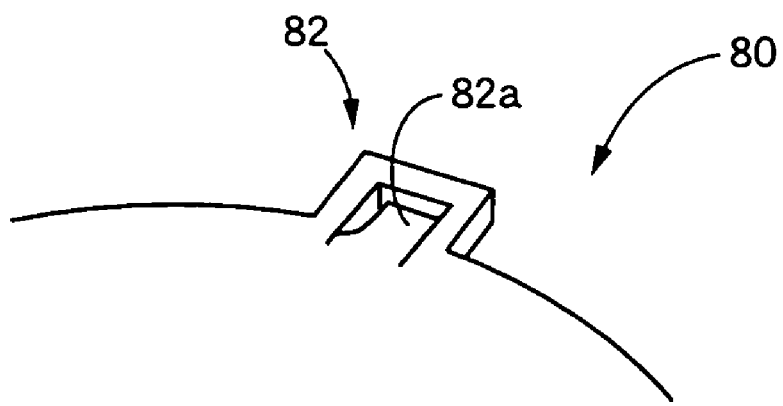
FIG. 6B is a perspective view of a second piston member of the piston constructed according to the third embodiment.

FIG. 6A is a view showing the engaging portion of the piston 18 constructed according to the third embodiment, while FIG. 6B is a perspective view of a second piston member 80 in the third embodiment. In this third embodiment, the second piston member 80 has a plurality of engaging protrusions 82, which radially outwardly protrude and are arranged in the circumferential direction, as the above-described engaging protrusions 48a, 72. Each of the engaging protrusions 82 has a rectangular-shaped elastic lug 82a provided by its rectangular-shaped central portion that is inclined with respect to the radial direction. The elastic lug 82a is formed by a pressing operation in which the rectangular-shaped central portion of each engaging protrusion 82 is cut and bent in the axial direction about its radially inner end, so that the elastic lug 82a is held in pressing contact at its distal end portion with the radially extending surface 68a of the corresponding engaging groove 68. In this third embodiment, too, each elastic lug is held in contact with the radially extending surface 68a in a "surface-to-surface" contact manner.

Figure 7:
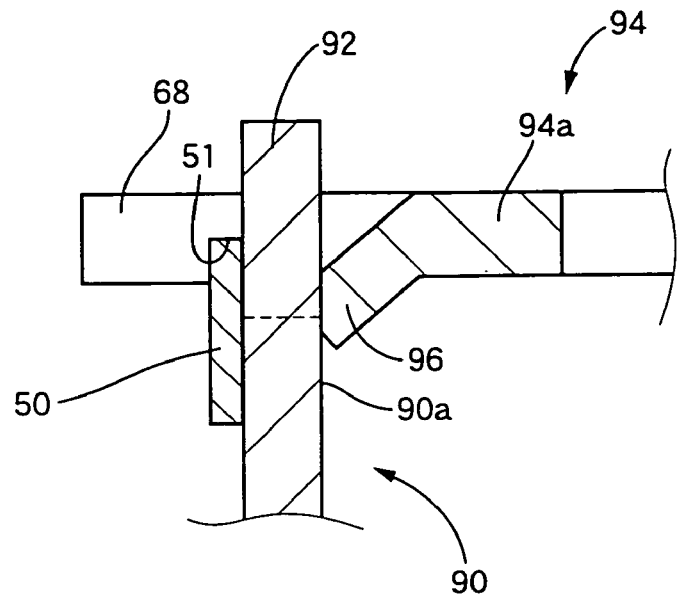
FIG. 7 is an enlarged view in cross section of an engaging portion of a piston constructed according to a fourth embodiment of the invention.

FIG. 7 is a view showing the engaging portion of the piston 18 constructed according to the fourth embodiment, at which first and second piston members 94, 90 are engaged with each other. In this fourth embodiment, the second piston member 90 has a plurality of engaging protrusions 92, which radially outwardly protrude and are arranged in the circumferential direction, as the above-described engaging protrusions 48a, 72, 82. However, unlike the engaging protrusions 48a, 72, 82, each of the engaging protrusions 92 is held in parallel to the radial direction, without its entirety or portion being bent. Instead, the first piston member 94 has, in its cylindrical portion 94a, has portions that are bent in a radially inward direction of the first piston member 94. Each of the thus bent portions of the first piston member 94 defines the axially inner end of the corresponding engaging groove 68, and provides an elastic lug 96. In the fourth embodiment, the elastic structure is provided by the elastic lugs 96 each of which is held in pressing contact at its distal end portion with a radially extending surface 90a of the second piston member 90. It is noted that the bent portions do not have to be bent necessarily in the radially inward direction of the first piston member 94 but may be bent in a radially outward direction of the piston member 94. In this fourth embodiment, too, each elastic lug is held in contact with the radially extending surface in a "surface-to-surface" contact manner.

Figure 8:
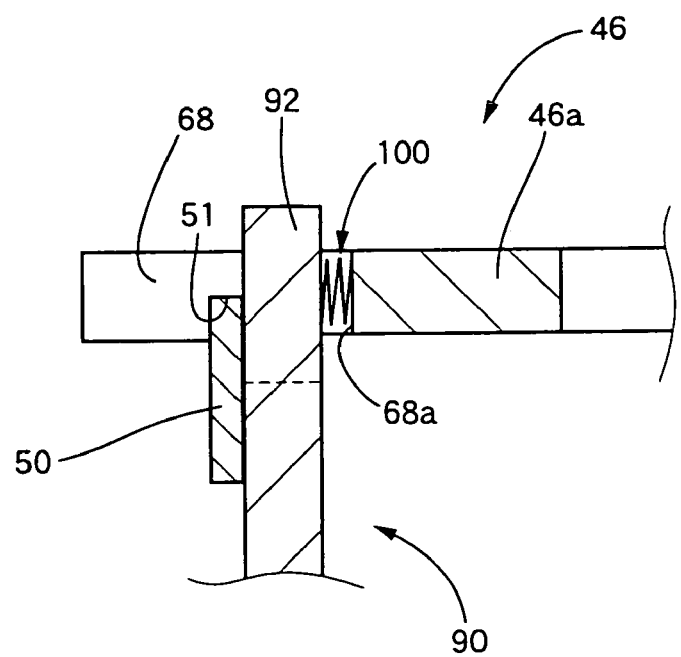
FIG. 8 is an enlarged view in cross section of an engaging portion of a piston constructed according to a fifth embodiment of the invention.

FIG. 8 is a view showing the engaging portion of the piston 18 constructed according to the fifth embodiment. In this fifth embodiment, neither the engaging protrusions 92 of the second piston member 90 nor the cylindrical portion 46a of the first piston member 46 is bent. Instead, the elastic structure is provided by an elastic member in the form of a coil spring 100 that is interposed between each of the engaging protrusions 92 and the radially extending surface 68a of the corresponding engaging groove 68 of the first piston member 46, such that the coil spring 100 is held in contact with each engaging protrusion 92 and the radially extending surface 68a of the corresponding engaging groove 68. It is noted that the elastic member may be provided by, in place of the coil spring 100, another elastic member such as a disk spring and a rubber.

In the second and third embodiments, the elastic lug 72a, 82a is provided by a portion of each engaging protrusion 72, 82 that is bent in the axial direction so as to be inclined with respect to the radial direction, and is held in pressing contact at its distal end portion with the radially extending surface 68a of each engaging groove 68 of the first piston member 46, so that the first piston member 46 is biased in the axial direction by the elastic lug 72a, 82a. In the fourth embodiment, the elastic lug 96 is provided by a portion of the first piston member 94 that is bent in the radial direction so as to be inclined with respect to the axial direction, and is held in pressing contact at its distal end portion with the radially extending surface 90a of the second piston member 90, so that the first piston member 94 is biased in the axial direction by the elastic lug 96. In the fifth embodiment, the first piston member 46 is biased in the axial direction by the coil spring 100 that is interposed between the first and second piston members 46, 90. Therefore, in each of the second through fifth embodiments, too, a rattling movement of the first piston member 46, 94 in the axial direction is minimized or substantially eliminated, thereby preventing an unnecessary contact of the first piston member 46, 94 with the first set of frictional coupling elements 12, making it possible to improve the durability of the first piston member 46, 94 (i.e., durability of the radially outer piston 18), the durability of the first set of frictional coupling elements 12, the operating efficiency of the radially outer piston 18, and the power transmitting efficiency of the automatic transmission 8.

In the second and third embodiments, each of the elastic lugs 72a, 82a is provided by a portion of the corresponding engaging protrusion 72, 82, a biasing force generated by each elastic lug 72a, 82a can be made smaller whereby the first and second piston members 46, 70, 80 can be further easily assembled into the radially outer piston 18, as compared with the first embodiment in which each elastic lug is provided by an entirety of the corresponding engaging protrusion 48a.

In each of the second through fourth embodiments, too, each of the elastic lugs 72a, 82a, 96 is held in contact at its distal end portion with the corresponding radially extending surface 68a, 90a, in a "surface-to-surface" contact manner, so that each elastic lug is given an improved durability.

Figure 9:
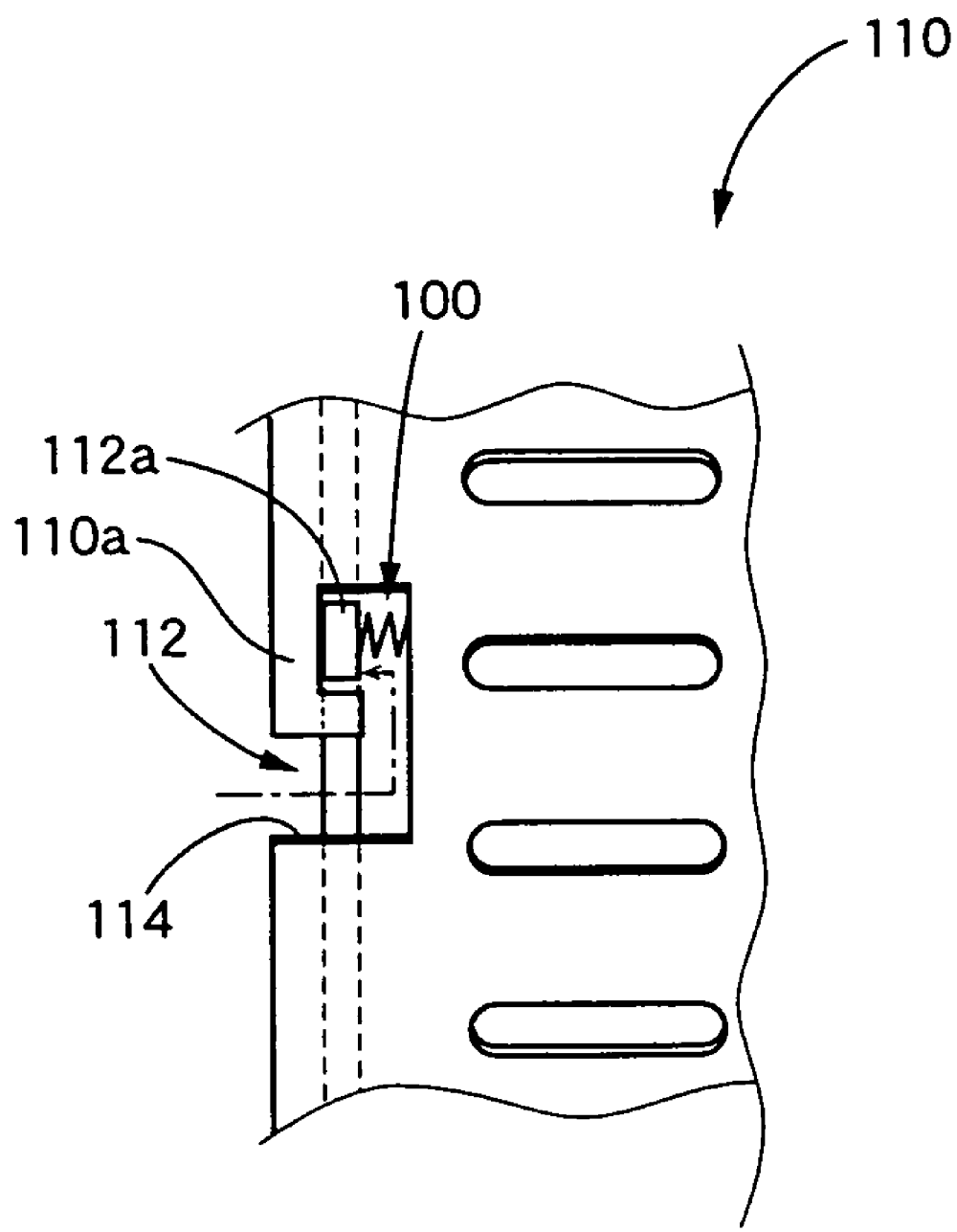
FIG. 9 is a view of an engaging portion of a piston constructed according to a sixth embodiment of the invention.

FIG. 9 is a view showing the engaging portion of the piston 18 constructed according to the sixth embodiment at which first and second piston members 110, 112 are engaged with each other. In the first through fifth embodiments, the snap ring 50 as the retainer is provided to hold the second piston member 48, 70, 80, 90 in a position relative to the first piston member 46, 94 in the axial direction, which position causes the elastic lug 48a, 72a, 82a, 90 or the coil spring 100 to be forced against the first piston member 46, 94 and/or second piston members 48, 70, 80, 90, and also to prevent the second piston member 48, 70, 80, 90 from being disengaged from the first piston member 46, 94. In this sixth embodiment, as shown in FIG. 9 which is the view corresponding to the view of FIG. 3 that is taken in the direction of the arrow-headed line 3 of FIG. 1, the first piston member 110 has a plurality of engaging grooves 114 formed in its axial end portions. The first piston member 110 also has a plurality of L-shaped portions 110a each of which projects in an axially outer open end portion of the corresponding engaging groove 114, such that each engaging groove 114 has a generally U shape or labyrinth shape as a whole. When the first and second piston members 110, 112 are to be engaged with each other, each of engaging protrusions 112a of the second piston member 112 is introduced into the corresponding engaging groove 114 through the axially outer open end portion of the groove 114, by moving the second piston member 112 relative to the first piston member 110 in the axial direction and then in the circumferential direction, as indicated by arrow of FIG. 9. After being thus introduced into the corresponding engaging groove 114, each engaging protrusion 112a is then received in a dead-end portion of the corresponding engaging groove 114 that is closed at its three sides, by moving the second piston member 112 relative to the first piston member 110 in the axial direction toward the axially outer open end portion of the engaging groove 114. In the present embodiment, the L-shaped portions 110a of the first piston member 110 serves as the retainer. It is noted that the elastic member may be provided by, in place of the coil spring 100, another elastic member such as a disk spring and a rubber.

While the preferred embodiments of the present invention have been described above in detail by reference to the accompanying drawings, for illustrative purpose only, it is to be understood that the present invention may be embodied otherwise.

While the radially outer piston 18 according to the illustrated embodiments is used for the clutch device 10 incorporated in the automatic transmission 8, the piston of the present invention may be used for a brake device incorporated in an automatic transmission.

In the above-described first through fourth embodiments, the elastic lugs 48a, 72a, 82a, 96 are configured to engaged with the radially extending surfaces 68a, 90a by "surface-to-surface" contact. However, the elastic lugs may be engaged with the radially extending surfaces by 68a, 90a by "line" or "point" contact, as long as the elastic lugs are given sufficient durability even in such an arrangement.

Figure 10:
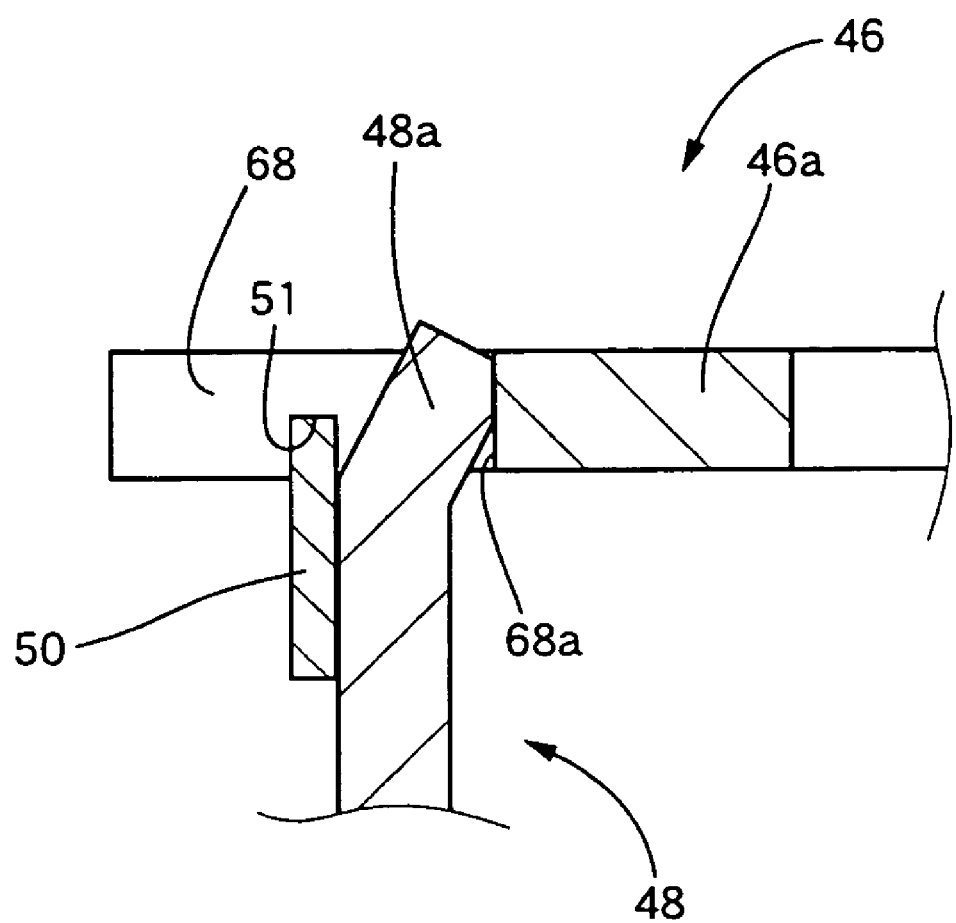
FIG. 10 is view of an engaging portion of a piston constructed according to a modification of the first embodiment, in which each engaging protrusion in its entirety serving as an elastic lug is formed by a bending operation.

Also in an arrangement as in the above-described first embodiment in which each of the engaging protrusions 48a in its entirety serves as the elastic lug, the engaging protrusion 48a may be formed by a bending operation rather than by a pressing operation (that is performed with use of a set of dies), so as to be shaped as shown in FIG. 10. In the arrangement of FIG. 10, a contact portion of the engaging protrusion 48a, which is held in contact with the radially extending surface 68a, is made substantially flat, for example, by a machining operation, so that the engaging protrusion 48a is held in contact at its flat surface with the radially extending surface 68a.

Figure 11:
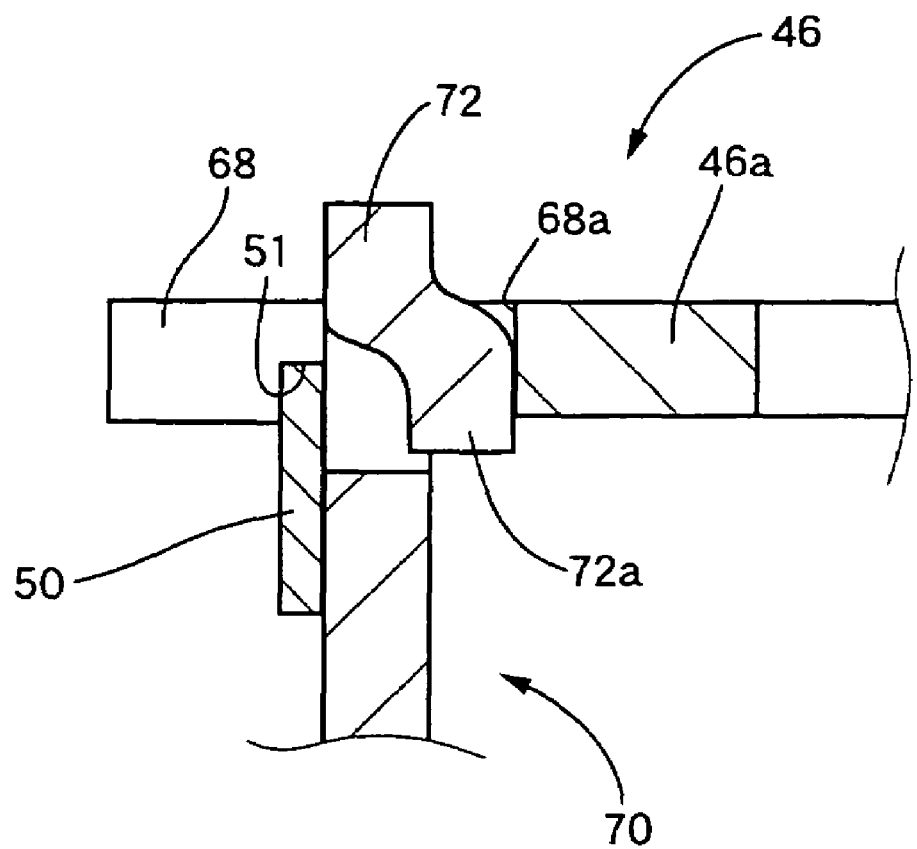
FIG. 11 is view of an engaging portion of a piston constructed according to a modification of the second embodiment, in which each elastic lug is formed by a pressing operation.
Figure 12:
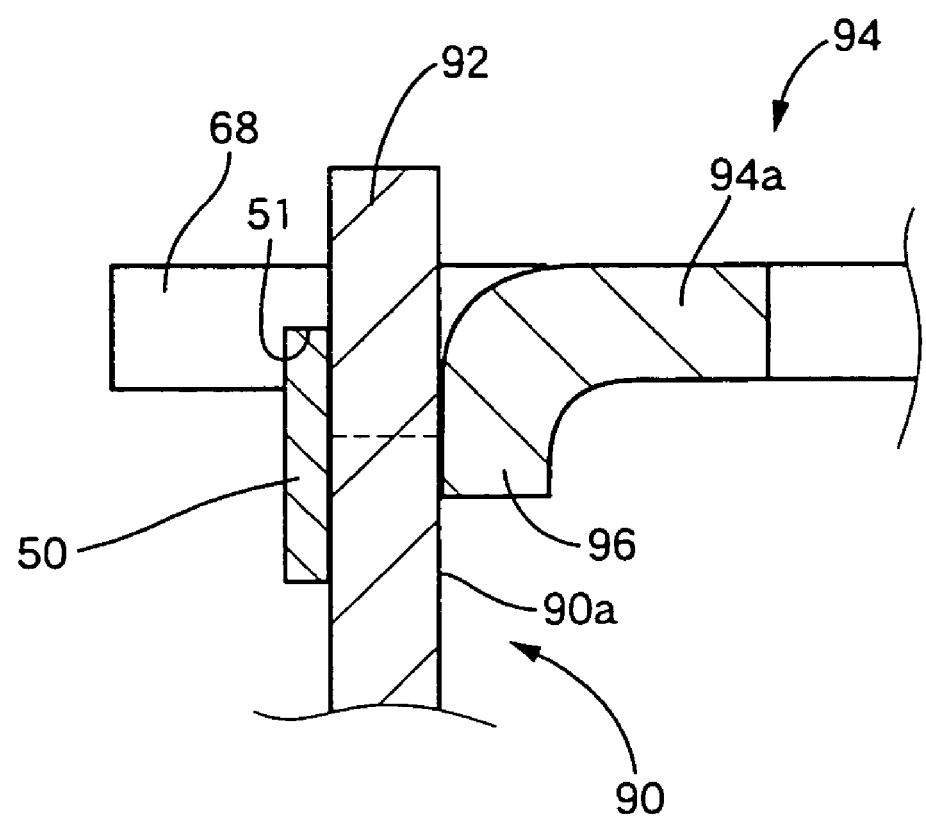
FIG. 12 is view of an engaging portion of a piston constructed according to a modification of the fourth embodiment, in which each elastic lug is formed by a pressing operation.

Also in an arrangement as in the above-described second embodiment in which the rectangular-shaped elastic lugs 72a are formed by cutting and bending the central portions of the respective engaging protrusions 72 of the second piston member 70 about their radially outer ends in the axial direction, the elastic lugs 72a may be formed by a pressing operation using a set of dies so as to be shaped as shown in FIG. 11. Further, also in an arrangement as in the above-described fourth embodiment in which the elastic lugs 96 are formed in the cylindrical portion 94a of the first piston member 94, the elastic lugs 96 may be formed by a pressing operation using a set of dies so as to be shaped as shown in FIG. 12.

While the embodiments of the present invention have been described above for illustrative purpose only, it is to be understood that the present invention may be embodied with various changes and improvements, which may occur to those skilled in the art.

What is claimed is:

1. A piston for an automatic transmission, comprising:
   a cylindrical wall portion provided by a first piston member;
   a bottom wall portion provided by a second piston member;
   an engaging portion at which said first piston member and said second piston member are engaged with each other such that said first piston member is movable relative to said second piston member in an axial direction of said piston by a small distance; and
   an elastic structure being provided at said engaging portion, and biasing said first piston member in said axial direction, so as to cause said first piston member and said second piston member to abut at an abutment surface between said first piston member and said second piston member.

2. The piston according to claim 1, which is operable to selectively place a clutch device of the automatic transmission in an engaged state and a released state thereof.

3. A piston for an automatic transmission, comprising:
   a cylindrical wall portion provided by a first piston member;
   a bottom wall portion provided by a second piston member; and
   an engaging portion at which said first and second piston members are engaged with each other such that said first piston member is movable relative to said second piston member in an axial direction of said piston by a small distance,
   wherein said piston further comprises an elastic structure which is provided at said engaging portion, and which biases said first piston member in said axial direction, so as to restrain movement of said first piston member relative to said second piston member in said axial direction,
   wherein said first piston member has, in an axially end portion thereof, at least one engaging groove at which said first piston member is engaged with said second piston member,
   wherein said second piston member has at least one elastic lug each provided by a portion thereof that is inclined with respect to a radial direction of said piston, and
   wherein said elastic structure includes said at least one elastic lug that is held in contact with a radially extending surface of said first piston member, said radially extending surface defining a corresponding one of said at least one engaging groove and being substantially parallel to said radial direction.

4. The piston according to claim 3,
   wherein said second piston member has a plurality of engaging protrusions which radially outwardly protrude and which are arranged in a circumferential direction of said piston, such that each of said plurality of engaging protrusions is engaged with a corresponding one of a plurality of engaging grooves as said at least one engaging groove,
   and wherein each of a plurality of elastic lugs as said at least one elastic lug is provided by a corresponding one of said plurality of engaging protrusions that are inclined with respect to said radial direction.

5. The piston according to claim 3,
   wherein said second piston member has a plurality of engaging protrusions which radially outwardly protrude and which are arranged in a circumferential direction of said piston, such that each of said plurality of engaging protrusions is engaged with a corresponding one of a plurality of engaging grooves as said at least one engaging groove,
   and wherein each of a plurality of elastic lugs as said at least one elastic lug is provided by a portion of a corresponding one of said plurality of engaging protrusions, said portion being inclined with respect to said radial direction.

6. The piston according to claim 3, wherein each of said at least one elastic lug has a surface which is substantially parallel to said radial direction and which is held in contact with said radially extending surface.

7. The piston according to claim 3, further comprising a retainer disposed to hold said second piston member in a position relative to said first piston member in said axial direction, said position causing said at least one elastic lug of said second piston member to be forced against said radially extending surface of said first piston member, so as to be elastically deformed,
   wherein said first piston member is biased in said axial direction, owing to a restoring force generated by said at least one elastic lug that is elastically deformed.

8. A piston for an automatic transmission, comprising:
   a cylindrical wall portion provided by a first piston member;
   a bottom wall portion provided by a second piston member; and
   an engaging portion at which said first and second piston members are engaged with each other such that said first piston member is movable relative to said second piston member in an axial direction of said piston by a small distance,
   wherein said piston further comprises an elastic structure which is provided at said engaging portion, and which biases said first piston member in said axial direction, so as to restrain movement of said first piston member relative to said second piston member in said axial direction,
   wherein said first piston member has at least one elastic lug each provided by a portion thereof that is inclined with respect to said axial direction of said piston,
   wherein said second piston member has a radially extending surface which is substantially parallel to a radial direction of said piston, and
   wherein said elastic structure includes said at least one elastic lug each of which is held in contact at a distal end portion thereof with said radially extending surface.

9. The piston according to claim 8, wherein each of said at least one elastic lug has a surface which is substantially parallel to said radial direction and which is held in contact with said radially extending surface.

10. The piston according to claim 8, further comprising a retainer disposed to hold said second piston member in a position relative to said first piston member in said axial direction, said position causing said radially extending surface of said second piston member to be forced against said at least one elastic lug of said first piston member, so as to elastically deform said at least one elastic lug,
    wherein said first piston member is biased in said axial direction, owing to a restoring force generated by said at least one elastic lug that is elastically deformed.

11. A piston for an automatic transmission, comprising:
    a cylindrical wall portion provided by a first piston member;
    a bottom wall portion provided by a second piston member; and an engaging portion at which said first and second piston members are engaged with each other such that said first piston member is movable relative to said second piston member in an axial direction of said piston by a small distance, wherein said piston further comprises an elastic structure which is provided at said engaging portion, and which biases said first piston member in said axial direction, so as to restrain movement of said first piston member relative to said second piston member in said axial direction, wherein said elastic structure includes an elastic member disposed in said engaging portion and interposed between said first and second piston members, such that said elastic member is held in contact with said first and second piston members.

12. The piston according to claim 11, further comprising a retainer disposed to hold said second piston member in a position relative to said first piston member in said axial direction, said position causing said elastic member to be forced against said first piston member and to be elastically deformed, wherein said first piston member is biased in said axial direction, owing to a restoring force generated by said elastic member that is elastically deformed.

* * * * *